United States Patent [19]

Sawara

[11] 4,319,818
[45] Mar. 16, 1982

[54] PHOTOGRAPHIC CAMERA

[75] Inventor: Kenji Sawara, Tokyo, Japan

[73] Assignee: Fuji Koeki Corporation, Tokyo, Japan

[21] Appl. No.: 173,717

[22] Filed: Jul. 30, 1980

[30] Foreign Application Priority Data

Jul. 30, 1979 [JP] Japan ................ 54/105167[U]

[51] Int. Cl.³ .................. G03B 15/03; G03B 15/02
[52] U.S. Cl. ............................... 354/145; 362/3
[58] Field of Search ............... 362/3, 8, 10, 18; 354/126, 128, 129, 145, 288

[56] References Cited

U.S. PATENT DOCUMENTS

| | | | |
|---|---|---|---|
| 2,388,995 | 11/1945 | Pollock | 354/126 |
| 2,783,696 | 3/1957 | Sewig | 354/126 |
| 3,204,089 | 8/1965 | Schmidt | 362/3 |
| 4,106,037 | 8/1978 | Nakamura et al. | 354/128 |

FOREIGN PATENT DOCUMENTS

| | | | |
|---|---|---|---|
| 53-65729 | 6/1978 | Japan | 354/145 |
| 783660 | 9/1957 | United Kingdom | 354/129 |

*Primary Examiner*—Donald A. Griffin
*Attorney, Agent, or Firm*—Fleit & Jacobson

[57] ABSTRACT

A photographic camera of the present invention comprises a camera unit and a flash unit pivotably mounted on said camera unit. The camera unit comprises a light-tight housing, a light receiving member for receiving light reflected from an object to be photographed and mounted on the housing. The flash unit comprises a casing which is pivotably connected to said housing by a connecting member and a flash member for producing a flash light. Said casing of the flash unit serves as a cover of said light receiving member.

10 Claims, 7 Drawing Figures

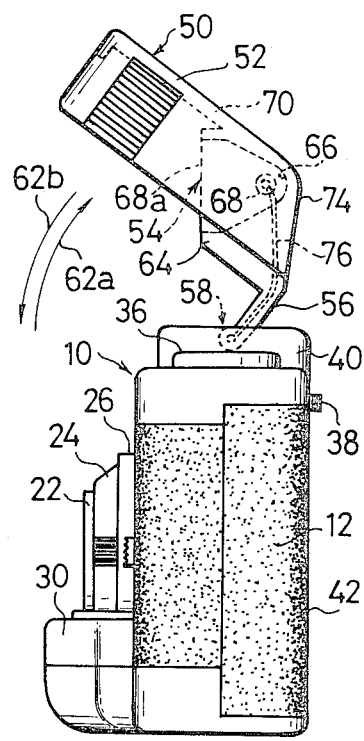
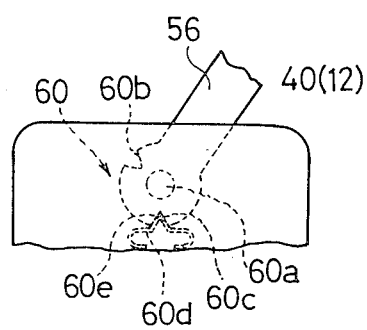
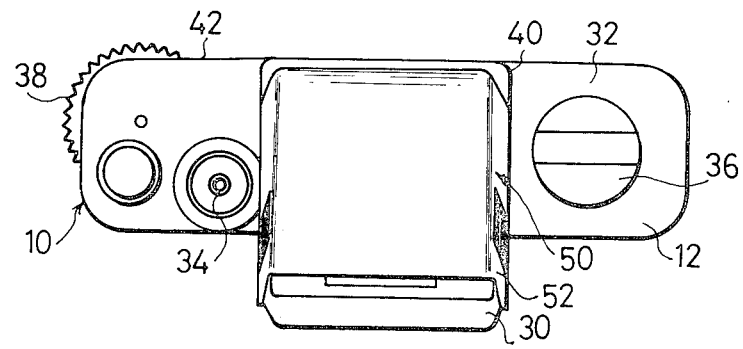

PHOTOGRAPHIC CAMERA

BACKGROUND OF THE INVENTION

The present invention relates to a photographic device, and more particularly to a photographic camera for taking a photograph by means of using flash-light illumination.

In recent years, a photographic camera incorporating an electric flash unit is widely employed as a photographic device using the flash-light illumination. It is, however, preferable in this photographic device, to miniaturize a camera and a flash device, since a photographic camera of this type is generally portable.

An encountered problem is that the red-eye effect in colour photographing generates in a miniaturized camera such as, for example, a pocket camera. The red-eye effect is likely to generate, particularly when a light axis of a flash light of the flash unit is parallel and nearest with respect to an optical axis of the photographing lens. Accordingly, it is necessary to isolate an axis of the flash light of the flash unit about more than 60 mm from the optical axis of the photographing lens.

Further encountered problem in the photographic camera is that the photographic lens must be generally covered by a cap in order to prevent the photographing lens from being dirty due to the attachment of the dust and to prevent the destruction of the lens due to the external mechanical shock, when the photographic camera is not used.

It is, however, very troublesome, in operating, to put on a cap to the lens and to remove the cap from the lens, as well as is uneconomical because the cap is often lost in treating the camera.

The use of electric flash devices has increased even further as it has become increasingly common to provide cameras with built-in flash devices. However, it is difficult to make the electric flash device sufficiently small for this purpose and yet sufficiently powerful in terms of light output, without employing an undesirably complicated and costly manufacturing process.

SUMMARY OF THE INVENTION

An object of the invention is to provide an improved photographic camera which is high photographing performance and which is high reliability in using.

Further object of the invention is to provide an improved photographic camera incorporating a flash device in which a flash unit can be rotated in a simple manner and in which a photographic lens of the camera can be covered and protected by means of the flash unit.

In accordance with the above objects, there is provided a photographic camera comprising a camera unit including a flash-tight housing, a light receiving member for receiving light reflected from an object to be photographed and including a photographing lens and a shutter release member for actuating the opening and closing operations of said light receiving member, said light receiving member and said shutter release member are incorporated to said housing, and a flash unit including a casing pivotably mounted on said housing of the camera unit by a connecting member and a flash member for producing a flash light and provided in said casing spaced at predetermined distance from said connecting member, said casing of the flash unit is formed so as to cover said light receiving member of said camera unit.

The invention, and its objects and advantages, will more become apparent in the detailed description of the preferred embodiment.

BRIEF DESCRIPTION OF THE DRAWINGS

In the detailed description of a preferred embodiment of the invention presented hereinafter, reference is made to the accompanying drawings, in which:

FIG. 2 is a side view of a photographic camera according to the present invention when the photographic camera is used to take a picture;

FIG. 3 is a plan view of a photographic camera when it is used to take a picture;

FIG. 4 is an enlarged view of a connecting member of a photographic camera according to the present invention;

DESCRIPTION OF A PREFERRED EMBODIMENT

Figure 1:
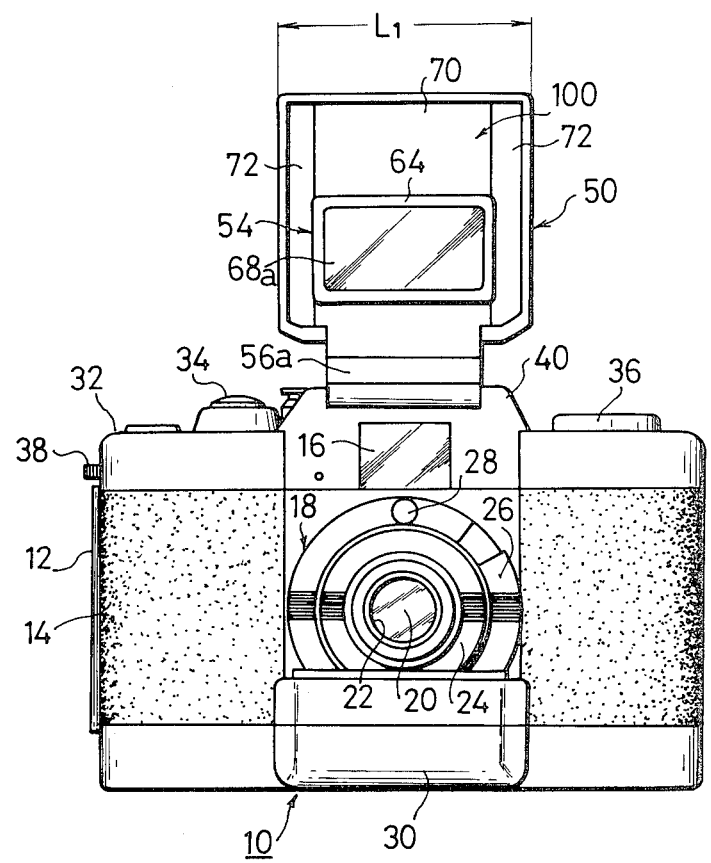
FIG. 1 is an elevational view of a photographic camera according to the present invention when the photographic camera is used to take a picture.

There is shown in the drawings a photographing device comprising a photographic camera unit 10 having an enclosed generally light-tight housing 12 and a flash unit 50 which is pivotably mounted to the housing 12 of the photographic camera unit 10. Mounted within a frontplate 14 of the housing 12 are a viewfinder 16 and a light receiving member 18 for receiving a reflected light from an object to be photographed. The light receiving member 18 comprises a photographing lens 20 mounted in a lens opening 22 which is provided in a center portion of the frontplate 14 of the housing 12, a focus ring 24 which is rotatably and coaxially provided in a peripheral portion of the lens opening 22, an aperture ring 26 provided coaxially with the focus ring 24, and a light receiving element 28. A protecting bracket 30 is provided in a lower side of the frontplate 14 so as to project from a surface of the frontplate 14. Mounted in a top wall 32 are a shutter release member 34 and a film rewinding lever 36. A film winding reel 38 is provided on an end portion of a rear wall 42 of the housing 12. The shutter release member 34 located within the top wall 32 is operably coupled to a shutter mechanism located within the camera housing 12 in alignment with the lens opening 22 to regulate the amount of light, reflected from a scene to be photographed, projected through the lens opening 22, the shutter being actuable in response to a camera operator depressing the shutter release member 34.

The flash unit 50 comprises, substantially, a casing 52 pivotably mounted on the top wall 32 of the camera housing 12, and a flash member 54 provided within the casing 52 and for producing a flash light. The casing 52 of the flash unit 50 is pivotably connected to a projecting portion 40 formed on a center portion of an upper surface of the top wall 32 of the housing 12 by a connecting arm 56 and a connecting member 58. The connecting member 58 constituted by a conventional ratch mechanism 60. As is shown in FIG. 4, the ratch mechanism 60 includes a rotating shaft 60a which is fixed on the connecting arm 56 and which is pivotably engaged with the projecting portion 40 of the housing 12. The ratch mechanism 60 includes recesses 60b and 60c provided on an end portion of the connecting arm 56, a plate spring 60d carried in the projecting portion 40 of the housing 12, and a pawl segment 60e which is formed with the plate spring 60d in one piece. Accordingly, the flash unit 50 is rotatable as is shown in FIG. 2 by arrows 62a and 62b with respect to the housing 12 of the camera unit 10.

In more detail, the flash unit 50 comprises the casing 52 connected to the housing 12 by the connecting member 58 and the flash member 54 incorporated in a base portion of the casing 52. An end portion of the casing 52 serves as a cover member 100 of the light receiving member 18 of the camera unit 10. The flash member 54 comprises a frame 64 formed in one piece with the base portion of the casing 52, a reflecting mirror 66 carried by the frame 64, a flash tube 68 inserted into the reflecting mirror 66, and a flash window 68a.

Furthermore, the casing 52 has a flat portion 70 of the end portion of the casing 52 and curved portions 72 which is curved at side edge of the flat plate 70 at a predetermined angle and suitable height to form the cover member 100.

Figure 5:
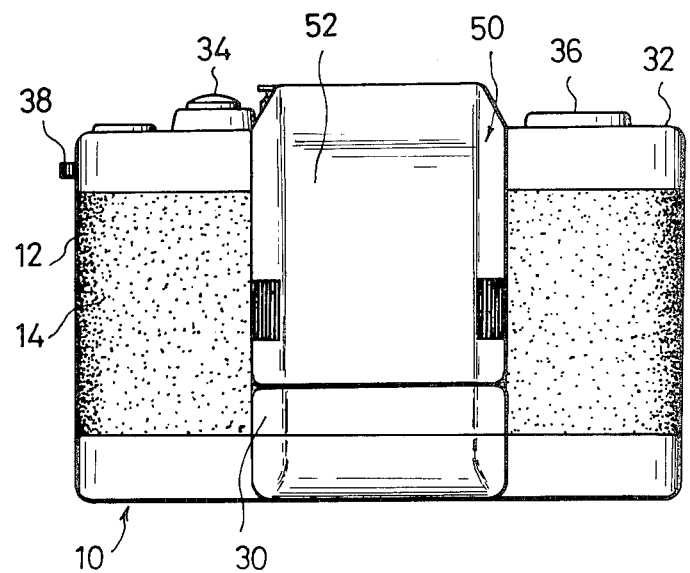
FIG. 5 is an elevational view of a photographic camera according to the present invention when it is not used to take a picture.
Figure 6:
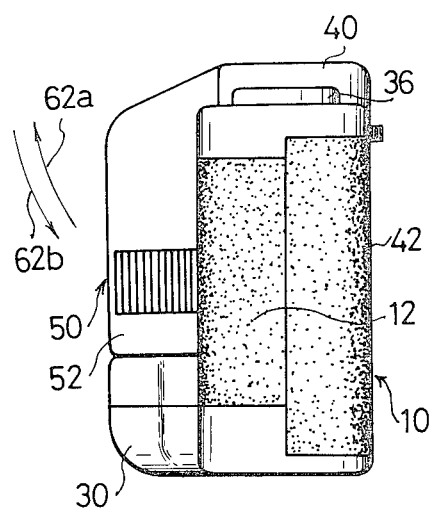
FIG. 6 is a side view of a photographic camera according to the present invention when it is not used.
Figure 7:
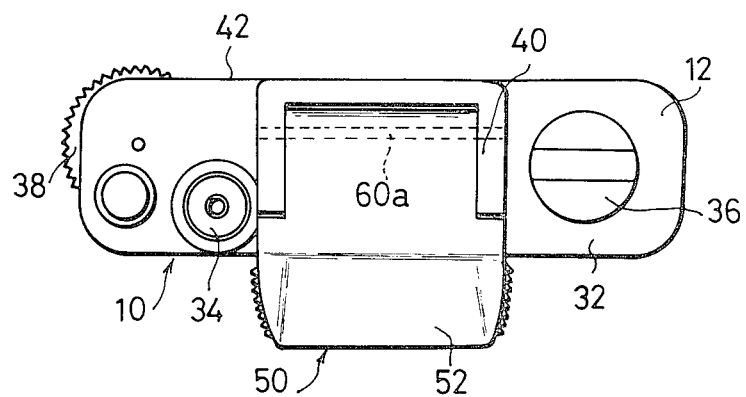
FIG. 7 is a plan view of a photographic camera according to the invention when it is not used.

As is best shown in FIG. 1, the flash member 54 is provided in the flat portion 70 of the casing 52, and the width $L_1$ of the flat portion 70 is set so as to be equal to the width of the light receiving member 18 of the camera unit 10. Accordingly, when the casing 52 of the flash unit 50 is rotated toward a direction as shown by the arrow 62b of FIG. 2, the light receiving member 18 of the camera unit 10 is covered by the casing 52 of the flash unit 50, as is shown in FIGS. 5 to 7.

As is shown in FIGS. 1 and 2, the casing 52 further comprises a curved portion 74 which is formed so as to be communicated with the flat portion 70 and a flat portion 56a of the connecting arm 56.

The connection between the camera unit 10 and the flash unit 50 is a clamping connection, and this is such a manner that in each of the positions to be occupied by the flash unit 50. The position can be changed with some pressure, for example, by means of the hand. The axis of rotation of the flash unit 50 may divide, for example, a front face of the housing 12 of the camera unit 10 in two positions. In a special embodiment of a flash unit 50 in which the casing 52 has the shape of a rectangular parallelepiped the axis of rotation of the flash unit 50 substantially coincides with the front surface of the housing 12 of the camera unit 10.

An advantage of this special embodiment is that the light receiving member 18 of the camera unit 10 is covered and protected by the casing 52 of the flash unit 50. This may lead to an extremely compact structure of the photographic camera, which is readily transportable.

More specifically, FIGS. 1 to 4 show a using state, and FIGS. 5 to 7 illustrate an unusing state of the photographic camera.

As is shown in FIGS. 1 to 4, the photographing lens 20 is provided on the center portion of the front face 14 of the housing 12. The flash unit 50 is pivotably connected to the top wall 32 of the housing 12 of the camera unit 10. A flexible lead 76 extends from the flash tube 68 of the flash member 54 to the interior of the housing 12 of the camera unit 10. A flash control equipment for this flash tube 68 is present in this housing 12.

The flash control equipment comprises, substantially, a direct current power source circuit, a voltage converter circuit for converting and boosting a direct current voltage from the direct current power source circuit to an alternating current voltage, a rectifier circuit for rectifying the alternating current voltage from the voltage converter circuit, an electric charge storing circuit including a main storage capacitor and for supplying the electrical energy to the flash tube 66, and a trigger pulse generating circuit for triggering a flash tube 66.

The direct current power source circuit has a battery and a power source switch, and the voltage converter circuit includes an oscillating switch element and an oscillating transformer. The power source switch of the direct current power source circuit may be provided on the housing 12 of the camera unit 10 so as to be actuated by associating with the rotating positions of the casing 52 of the flash unit 50. The electric charge storing circuit includes a main storage capacitor and an indicating lamp in the form of a neon glow lamp for indicating charging condition of the main storage capacitor. The trigger pulse generating circuit includes a triggering capacitor and a triggering transformer and triggers the flash tube 68 of the flash member 54.

A flash-firing mechanism may be of the type that produces an electronical signal that is applied to an electronic switching element, rather than directly to a flash unit. For example, the electronical signal may be utilized to activate a trigger circuit of the flash unit. The trigger circuit may, for example, include a trigger capacitor in series with the primary winding of a transformer, the transformer having a high voltage secondary winding connected to the flash trigger electrode. When the flash-firing mechanism of this type is activated, the electrical signal produced thereby operates to render the electronic switching element conductive. When this happens, the trigger capacitor discharges and due to the transformer a high voltage signal is applied to the trigger electrode to initiate firing of the flash tube.

According to the photographic camera constructed in accordance with the foregoing description, the casing 52 of the flash unit 50 serves as a protecting cover 100 of the photographing lens 20, as is shown in FIGS. 5 to 7, when the camera is not used. In this case, the casing 52 is clamped by engagement of recess 60c of the connecting arm 56 and the pawl 60e of the plate spring 60d, as can be seen in FIG. 4. The flash member 54 and the viewfinder 16 are also enclosed in a space formed between the casing 52 of the flash unit 50 and the housing 12 of the camera unit 10. It is, further possible to perform the OFF operation of the power source switch, the shutter locking operation and the OFF operation of the indicating lamp.

When using the camera unit 10 and the flash unit in order to take flash-photographs, the casing 52 of the flash unit 50 is rotated toward the direction of the arrow 62a as is shown in FIG. 6, and is set the position of the flash unit 50 as is shown in FIGS. 1 to 4. In this case, the casing is also clamped by the engagement of recess 60c of the connecting arm 56 and the pawl 60e of the spring plate 60d as is shown in FIG. 4. As is best shown in FIGS. 1 and 2, the flash member 54 is located such that the distance between the center of the lens 20 and the center of the flash member 54 becomes more than about 60 mm and such that a flash light direction of the flash member 54 becomes parallel with respect to a center line of the lens 20. Under these conditions, the main storage capacitor is fully charged to the predetermined and suitable voltage after the power source switch is closed. When the main storage is charged, the indicating lamp lights indicating that the device is readiness for flash tube 66 to be fired. The operation of the flash member 54 is initiated in synchronism with the shutter release member 34. A direct light can be produced from the flash tube 66 via the reflecting mirror 66 on to a person or object to be photographed, and thereby the photographing can be performed without pink-eye effect. Additionally, the natural light photographing can also be performed without employing the flash-light by means of turning OFF the power source switch.

In the state of FIGS. 1 to 4, the flash unit 50 can also be rotated toward the direction of the arrow 62b shown in FIG. 2, and thereby the casing 52 of the flash unit 50 is located to fit with the protecting bracket 28 of the camera unit 10 in order to cover the lens 22 of the light receiving member 18 of the camera unit 10, as is shown in FIGS. 5 to 7.

Accordingly, the cap to be attached to the photographing lens 20 is unnecessary, because the photographing lens 20 is covered by the casing 52 of the flash unit 50 in case the camera unit 10 is not used. The avoidance of the cap makes photographing operation convenience. Furthermore, the lowering of the photographing performance is prevented due to the elimination of the attachment of the dirty, as well as the destruction of the photographing lens 20 is prevented by means of the protecting function of the casing 52.

In view of the above, it will be seen that the several objects of the invention are achieved and other advantageous result are attained.

While a preferred embodiment of the invention has been shown and described, it will be apparent to those skilled in the art that modifications can be made without departing from the principle and spirit of the invention, the scope of which is defined in the appended claims. Accordingly, the foregoing embodiment is to be considered illustrative, rather than restricting of the invention and those modifications of the claims are to be included herein.

What is claimed is:

1. A photographic camera comprising a camera unit including a housing which can be sealed to form a light-tight enclosure, a light receiving member for receiving light reflected from an object to be photographed and including a lens and a shutter release member for actuating opening and closing operations of said light receiving member, said light receiving member and said shutter release member being incorporated in said housing, and a flash unit including a casing pivotably mounted on said housing of the camera unit by a connecting member and a flash member for producing a flash light and provided in said casing spaced at predetermined distance from said connecting member, said casing of the flash unit being formed so as to cover said light receiving member of said camera unit, said connecting member comprising position arresting means for arresting the rotation of said flash unit in at least two positions, and said casing of the flash unit having means for performing a shutter locking operation when said casing is closed.

2. A photographic camera as claimed in claim 1, wherein a portion of said casing of the flash unit forms a cover for enclosing at least a lens of said light receiving member of said camera unit.

3. A photographic camera as claimed in claim 2, wherein said camera unit further includes a protecting bracket provided at the lower side of said housing to form a cover of said light receiving member together with said casing of the flash unit.

4. A photographic camera as claimed in claim 1, wherein said light receiving member comprises a photographing lens mounted on the casing, a focus ring rotatably and coaxially provided in a peripheral portion of said lens, an aperture ring provided coaxially with respect to said lens and on said housing, said casing of the flash unit forms a cover member for covering said light receiving member.

5. A photographic camera as claimed in claim 1, wherein said camera unit further including a viewfinder, and said flash unit forms a cover for covering said viewfinder.

6. A photographic camera as claimed in claim 1, wherein said camera unit having a projecting portion provided on a top wall of said housing, and said casing of said flash unit is pivotably connected to said projecting portion of said camera unit.

7. A photographic camera as claimed in claim 1, wherein said position arresting means comprises a ratch mechanism including at least two engaging recesses provided spaced at predetermined distance to said casing and a plate spring provided in said housing and having pawl segment for engaging said recesses.

8. A photographic camera as claimed in claim 1, wherein said casing of the flash unit has means for performing an OFF operation of a power source switch, and an OFF operation of an indicating lamp for indicating that the readiness for flash is completed, when said casing is closed.

9. A photographic camera as claimed in claim 8, wherein said casing of the flash unit has means for making said power source switch being able to be an ON operation, when said casing is opened.

10. A photographic camera comprising a camera unit including a housing which can be sealed in light-tight, a light receiving member for receiving light reflected from an object to be photographed and including a lens and a shutter release member for actuating the opening and closing operations of said light receiving member, said light receiving member and said shutter release member being incorporated in said housing, and a flash unit including a casing pivotably mounted on said housing of the camera producing a flash light and provided in said casing spaced at predetermined distance from said connecting member, said casing of the flash unit being formed so as to cover said light receiving member of said camera unit, said connecting member comprising position arresting means for arresting the rotation of said flash unit in at least two positions, said position arresting means having a ratch mechanism including at least two engaging recesses provided spaced at predetermined distance to said casing and a plate spring provided in said housing and having pawl segment for engaging said recesses.

* * * * *